(12) United States Patent
Mäkelä et al.

(10) Patent No.: US 10,133,372 B2
(45) Date of Patent: Nov. 20, 2018

(54) USER DEVICE HAVING SEQUENTIAL MULTIMODAL OUTPUT USER INTERFACE

(75) Inventors: Kaj Markus Mäkelä, Helsinki (FI); Jussi Severi Uusitalo, Hameenlinna (FI)

(73) Assignee: Nokia Technologies Oy, Espoo (FI)

( * ) Notice: Subject to any disclaimer, the term of this patent is extended or adjusted under 35 U.S.C. 154(b) by 1407 days.

(21) Appl. No.: 12/004,772

(22) Filed: Dec. 20, 2007

(65) Prior Publication Data

US 2009/0164207 A1 Jun. 25, 2009

(51) Int. Cl.
*G10L 15/22* (2006.01)
*G06F 3/038* (2013.01)

(52) U.S. Cl.
CPC ...... *G06F 3/038* (2013.01); *G06F 2203/0381* (2013.01)

(58) Field of Classification Search
CPC ... G10L 21/06; G10L 21/00; G10L 2015/223; G10L 15/30; G10L 15/00; G10L 15/265; G10L 17/10; G10L 15/22; G10L 2015/088; G10L 13/00; G10L 15/1815; G10L 17/005; G10L 17/22; G10L 2015/228; H04M 3/4938; H04M 1/72561; H04M 3/4936; H04M 2201/42; G06F 3/167; G06F 2203/0381; G06F 17/30873; G06F 3/04842; G06F 9/4446; G06F 17/21; G06F 17/30976; G06F 9/5061; G06F 3/0481; G06F 3/0482; H04L 51/046; H04L 51/32; H04L 65/1089; H04L 65/4076; H04N 21/4126; H04N 21/25825; H04N 21/2665; H04N 21/4143; H04N 21/4316; H04N 21/4358; H04N 21/4622; H04N 21/4668; H04N 21/47; H04N 21/478; H04N 21/482;
(Continued)

(56) References Cited

U.S. PATENT DOCUMENTS 5,878,274 A * 3/1999 Kono ................. G06F 3/038
340/500
5,918,222 A * 6/1999 Fukui ................. G06Q 10/10
(Continued)

*Primary Examiner* — Michael Ortiz-Sanchez
(74) *Attorney, Agent, or Firm* — Harrington & Smith

(57) ABSTRACT

In one aspect of the exemplary embodiments of this invention an apparatus includes a user interface that contains a plurality of input modalities and a plurality of output modalities, and a data processor coupled with the user interface and configurable to present a user with a content item that includes a plurality of attributes. In response to user input that data processor is operable to partition at least some of the attributes into a plurality of presentation tokens, where an individual presentation token comprises at least one attribute. The data processor is further configurable to respond to further user input to define one of the plurality of input modalities to generate a trigger condition for individual ones of the presentation tokens, where generation of a trigger condition results in an associated presentation token being made manifest to the user. The plurality of input modalities may include two or more of physical or virtual keys, an input acoustic transducer, a speech recognition unit, and a gesture detection unit, and where the plurality of output modalities may include two or more of an output acoustic transducer, a speech synthesis unit, a vibro-tactile transducer, and a display screen.

31 Claims, 2 Drawing Sheets

(58) Field of Classification Search
CPC ............. H04N 21/8173; G06Q 10/109; G06Q 10/1093
See application file for complete search history.

(56) References Cited

U.S. PATENT DOCUMENTS

| | | | | |
|---|---|---|---|---|
| 6,912,581 | B2* | 6/2005 | Johnson et al. | 709/228 |
| 6,975,983 | B1* | 12/2005 | Fortescue | G06F 3/038 |
| | | | | 704/257 |
| 7,036,128 | B1* | 4/2006 | Julia | G06F 9/465 |
| | | | | 707/E17.071 |
| 7,376,897 | B1* | 5/2008 | Mao | G06F 9/4443 |
| | | | | 715/708 |
| 7,454,608 | B2* | 11/2008 | Gopalakrishnan et al. | 713/100 |
| 7,565,357 | B2* | 7/2009 | Rao | |
| 8,781,840 | B2* | 7/2014 | Jaramillo | G06F 17/30864 |
| | | | | 704/270.1 |
| 2002/0032751 | A1* | 3/2002 | Bharadwaj | H04L 29/06 |
| | | | | 709/218 |
| 2002/0184027 | A1* | 12/2002 | Brittan et al. | 704/258 |
| 2003/0064716 | A1* | 4/2003 | Gailey | G10L 15/22 |
| | | | | 455/414.1 |
| 2003/0182125 | A1* | 9/2003 | Phillips et al. | 704/270.1 |
| 2003/0187944 | A1* | 10/2003 | Johnson et al. | 709/209 |
| 2004/0019487 | A1* | 1/2004 | Kleindienst et al. | 704/270.1 |
| 2004/0172258 | A1* | 9/2004 | Dominach | G10L 15/22 |
| | | | | 704/277 |
| 2004/0236574 | A1* | 11/2004 | Ativanichayaphong et al. | |
| | | | | 704/231 |
| 2006/0061488 | A1* | 3/2006 | Dunton | G06Q 10/109 |
| | | | | 340/988 |
| 2006/0143007 | A1* | 6/2006 | Koh | G10L 15/22 |
| | | | | 704/243 |
| 2006/0156252 | A1* | 7/2006 | Sheshagiri | H04L 12/2803 |
| | | | | 715/825 |
| 2006/0288309 | A1* | 12/2006 | Cross, Jr. | G06F 3/038 |
| | | | | 715/825 |
| 2007/0003914 | A1* | 1/2007 | Yang | 434/236 |
| 2007/0260972 | A1* | 11/2007 | Anderl | 715/513 |
| 2008/0059587 | A1* | 3/2008 | Burtner et al. | 709/206 |
| 2008/0235021 | A1* | 9/2008 | Cross | G10L 21/06 |
| | | | | 704/257 |
| 2008/0255850 | A1* | 10/2008 | Cross et al. | 704/275 |
| 2010/0211617 | A1* | 8/2010 | Jain | G06F 17/3002 |
| | | | | 707/812 |

\* cited by examiner

USER DEVICE HAVING SEQUENTIAL MULTIMODAL OUTPUT USER INTERFACE

TECHNICAL FIELD

The exemplary and non-limiting embodiments of this invention relate generally to user apparatus, such as mobile devices suitable for use in a wireless communication system, methods and computer programs providing a user interface and, more specifically, relate to techniques to present information to a user.

BACKGROUND

Of particular interest herein are devices having a multimodal output. For example, a mobile device, such as a mobile communication device (e.g., a cellular phone), typically has multiple functions to provide status and contextual information. Some modern mobile devices have multimodal interaction capabilities, i.e., they have a plurality of input and output channels that enable user interaction with the device. The output may be provided through different channels individual ones of which are suitable for a particular use contexts. Non-limiting examples of output modalities include a visual display using a screen and lights, vibrotactile feedback, sound and voice (e.g., speech synthesis).

As it is typically the case that a mobile device used in a certain context cannot continuously be attended by the user, those modalities that enable eyes-free reception and hands-free interaction can be particularly useful.

A mobile device may often be used in a public place where surrounding people are able to see and hear the users' interaction with the device. For example, while receiving a call a speech synthesis function that enunciates the caller's ID through a loudspeaker of the device may disclose private information to surrounding people. In at least one type of currently available mobile device this feature can be selected from a menu setting and, once selected, the device is programmed to always enunciate the caller's name utilizing the speech synthesis capabilities of the device. However, this type of information, if made audible in the wrong context, may create an awkward situation for the user.

In general, finding an appropriate level in the information presentation in different contexts is difficult, as there is a balance between providing a required level of useful information and a need to minimize obtrusion. Any possible annoyance and interruption the device may create in a social situation should be minimized so as not to create a negative user experience.

It can be noted that there exist output modalities other than synthesized speech, such as an alarm note audio signal with corresponding notification details being displayed on a device screen, and expandable notifications, e.g., an error dialog can be expanded for obtaining technical details.

SUMMARY OF THE EXEMPLARY EMBODIMENTS

The foregoing and other problems are overcome, and other advantages are realized, in accordance with the non-limiting and exemplary embodiments of this invention.

In accordance with a first aspect of this invention the exemplary embodiments provide a method that includes presenting a user with a content item that comprises a plurality of attributes; partitioning at least some of the attributes into plurality of presentation tokens, where an individual presentation token comprises at least one attribute; and defining an input modality to generate a trigger condition for at least some individual ones of the presentation tokens, where generation of a trigger condition results in an associated presentation token being made manifest to the user.

In accordance with a further aspect of this invention the exemplary embodiments provide a computer-readable medium that stores program instructions, the execution of which result in operations that comprise presenting a user with a content item that comprises a plurality of attributes; n response to user input, partitioning at least some of the attributes into a plurality of presentation tokens, where an individual presentation token comprises at least one attribute; and in response to further user input, defining an input modality to generate a trigger condition for at least some individual ones of the presentation tokens, where generation of a trigger condition results in an associated presentation token being made manifest to the user.

In accordance with another aspect of this invention the exemplary embodiments provide an apparatus that includes a user interface comprised of a plurality of input modalities and a plurality of output modalities, and a data processor coupled with the user interface and configurable to present a user with a content item that comprises a plurality of attributes and, in response to user input, to partition at least some of the attributes into a plurality of presentation tokens, where an individual presentation token comprises at least one attribute. The data processor is further configurable to respond to further user input to define one of the plurality of input modalities to generate a trigger condition for at least some individual ones of the presentation tokens, where generation of a trigger condition results in an associated presentation token being made manifest to the user.

In accordance with another aspect of this invention the exemplary embodiments provide an apparatus that includes user interface means coupled with control means and comprising, means for presenting a user with a content item that comprises a plurality of attributes; means for partitioning at least some of the attributes into a plurality of presentation tokens, where an individual presentation token comprises at least one attribute; means for defining one of a plurality of input modalities to generate a trigger condition for an individual one of the presentation tokens, where generation of a trigger condition causes an associated presentation token being made manifest to the user using one of a plurality of output modalities; and means for defining one of the plurality of output modalities for making an associated one of the presentation tokens manifest to the user in response to the associated trigger condition being met. A plurality of trigger conditions may be generated sequentially by actions of a user with one or more of the input modalities for causing the corresponding plurality of presentation tokens to be made manifest in a sequential fashion to the user with the defined output modalities.

BRIEF DESCRIPTION OF THE DRAWINGS

The foregoing and other aspects of the teachings of this invention are made more evident in the following Detailed Description, when read in conjunction with the attached Drawing Figures, wherein.

DETAILED DESCRIPTION

As aspect of the exemplary embodiments of this invention is to controllably minimize an amount of information and a level of detail that a device publicly presents. For example, when a calendar function alarm is played because of an upcoming event, the subject of the event does not necessarily always need to be known by the user, whereas at other times this type of information may be important to have, as it would significantly enhance the user's experience and the usability of the device.

Figure 1:
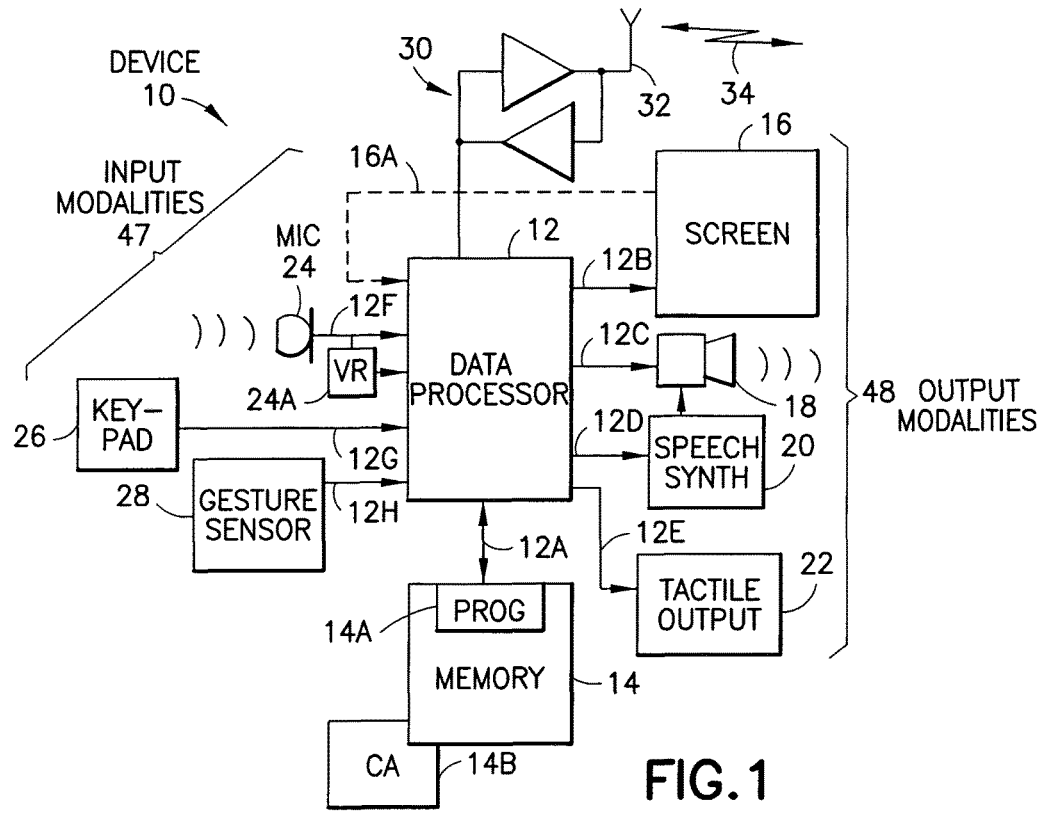
FIG. 1 is a block diagram of a device that is suitable for embodying the embodiments of this invention.

Reference is made to FIG. 1 for illustrating a simplified block diagram of an exemplary embodiment of an electronic device 10 that is suitable for use in practicing the exemplary embodiments of this invention. In FIG. 1 device 10 includes a data processor 12 that is coupled through a bus 12A with a memory 14 that stores a program (PROG) 14B of instructions that are executable by the data processor 12. The device 10 further includes a plurality of input and output devices and subsystems, referred to herein also as input modalities 47 and output modalities 48. As exemplary output devices there may one or more of a visual display screen 16, such as an LCD or a plasma display screen, an acoustic output transducer such as a loudspeaker 18, a speech synthesis subsystem 20 having an output that can be played through the loudspeaker 18 (or through another acoustic output transducer), and a tactile output device or transducer 22, such as a vibratory device (e.g., a piezoelectric transducer). These output devices are coupled to corresponding output paths 12B, 12C, 12D and 12E from the data processor 12. As exemplary input devices there may one or more of an acoustic input transducer such as a microphone 24, an associated speech or voice recognition function (VR) 24A, a keypad or keyboard 26 and a gesture sensor 28, such as a device that is responsive to a rotation about at least one axis and/or to a force applied by a user's finger or a stylus, such as when making a tapping gesture. These input devices are coupled to corresponding input paths 12F, 12G and 12H to the data processor 12. If the screen 16 is a touch-sensitive screen then there may also be an input 16A from the screen 16 to the data processor 12. In this case the input to the data processor may represent activation of a virtual key or button by the user, as opposed to the use of the keypad/keyboard 26 where the input signal may represent activation of a physical key or button (such as an alphanumeric key or a physical, 'soft' key or button). The microphone 24 may be coupled with the speech recognition functionality of the device 10 (the VR 24A) whereby a word or words spoken by the user can be interpreted by the data processor 12 as representing a command.

In general, gestures may be considered as taking place on a surface, such as the screen 16 and/or in three dimensional space (e.g., such as by waving, shaking and/or tapping the device 10), as non-limiting examples. In addition, there may be a number of different types of tactile/haptic signals (other than vibro-tactile), such as transforming surfaces and force feedback, as non-limiting examples. In general, and as considered herein, tactile sensation/feedback (which may encompass sensing through touching) may be considered a subset of haptic sensation/feedback (which may include kinesthetics and bodily awareness).

In view of the foregoing description, the particular embodiment of the device 10 shown in FIG. 1 is not to be considered in any way as limiting the various forms and manifestations of apparatus in which the exemplary embodiments of this invention may be practiced.

Further, it should be realized that the input modalities 47 can include brain wave and other neurological signal detection and interpretation input devices, as well as various types of biometric sensors, including eye trackers (e.g., gaze direction) and other types of sensors.

It should be appreciated that the data processor block 12 may actually comprise a number of circuit types, in addition to a data process or per se, such as analog-to-digital converters and digital-to-analog converters, that support the operation of the various input modalities 47 and output modalities 48.

In some embodiments the device 10 may have user communication capabilities, and will include a suitable transceiver 30, such as a radio frequency transceiver coupled with at least one antenna 32 for conducting wireless communications through a bidirectional radio frequency link 34 (e.g., a link to a cellular communication network, or a low power radio frequency link such as a Bluetooth™ link). In other embodiments the transceiver 30 may be optically based and may then include suitable optical source and detector components, such as an infrared emitter and an infrared detector.

The PROG 14A is assumed to include program instructions that, when executed by the data processor 12, enable the electronic device 10 to operate in accordance with the exemplary embodiments of this invention, as will be discussed below in greater detail.

In general, the various embodiments of the device 10 can include, but are not limited to, cellular phones, personal digital assistants (PDAs) possibly having wireless communication capabilities, portable computers possibly having wireless communication capabilities, image capture devices such as digital cameras possibly having wireless communication capabilities, gaming devices possibly having wireless communication capabilities, global positioning systems (GPS) possibly having wireless communication capabilities, music storage and playback appliances possibly having wireless communication capabilities, Internet appliances permitting wireless or wired Internet access and browsing, as well as portable units or terminals that incorporate combinations of such functions.

The exemplary embodiments of this invention may be implemented by computer software executable by the data processor 12, or by hardware, or by a combination of software and hardware (and firmware).

The memory 14 may be of any type suitable to the local technical environment and may be implemented using any suitable data storage technology, such as semiconductor-based memory devices, flash memory, magnetic memory devices and systems, optical memory devices and systems, fixed memory and removable memory. The data processor 12 may be of any type suitable to the local technical environment, and may include one or more of general purpose computers, special purpose computers, microprocessors, digital signal processors (DSPs) and processors based on a multi-core processor architecture, as non-limiting examples.

The exemplary embodiments of this invention provide in one aspect thereof a method to control the level of detail, and an amount of information provided through a multimodal output, in a sequential manner. For the purposes of this description the exemplary output devices represented by the visual display screen 16, the loudspeaker 18, the speech synthesis subsystem 20 and the tactile output device or transducer 22 may be considered to generally present and/or provide a multimodal output. More specifically, those output devices that are capable of an acoustic output, such as the loudspeaker 18 alone or in combination with the speech synthesis subsystem 20, may be considered to present and/or provide the multimodal output.

In the exemplary embodiments of this invention a multimodal (e.g. audio/speech) output is partitionable into a sequence of tokens, where each token in the sequence refines the level of detail, or expands the amount of information, that the user is provided, as compared to a previous token in the sequence. To access (e.g., hear) a next token in order to receive additional information the user may activate one of the input modalities 47, such as the microphone 24, the keypad or keyboard 26, the gesture sensor 28 or the touch screen 16, to trigger a continuation of the output presentation by the use of, for example, haptic interaction (e.g., using the gesture sensor 28) or by issuing a voice command (e.g., using the microphone 24 in combination with speech recognition 24A).

Provided now are non-limiting examples of the division of the multimodal output into discrete tokens.

Figure 2:
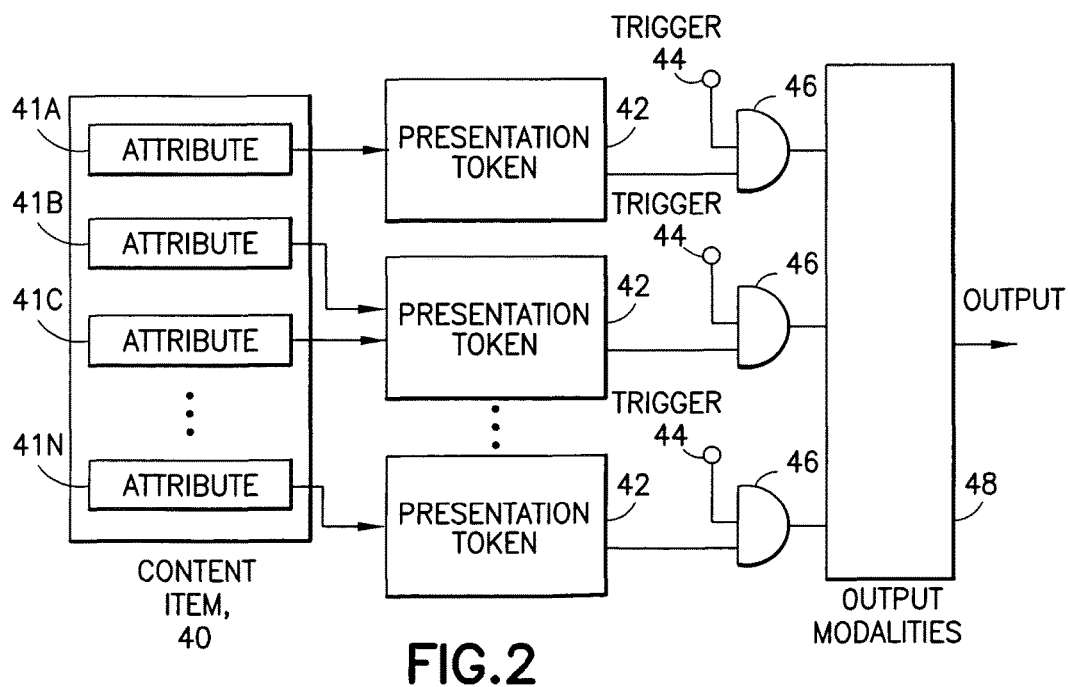
FIG. 2 is a logical depiction of the partitioning of attributes of a content item into a plurality of presentation tokens, and the use of trigger conditions to make individual ones of the presentation tokens manifest to a user via a plurality of output modalities.

Referring to FIG. 2, a content item 40 to be presented to the user typically has several attributes 41A, 41B, . . . , 41n, i.e., granular elements and sub-elements that provide additional information regarding the content item 40. These attributes 41 can be, for example, a name of a calendar event, a location of the event, and so forth.

Assume as a non-limiting example that the content item 40 is a calendar event notification that is generated by a calendar application (CA) 14B that is embodied as executable program instructions in the memory 14 of FIG. 1. Assume further for this example that the user needs to be given a notification of a calendar event scheduled to occur on Thursday, 12 Oct. 2006, between 12:00-13:00. The event subject is "Meeting", at location "meeting room", with participants "John, Bill, Jill". This information is dividable into a plurality of detail levels or attributes 41 as follows:
something occurs now (e.g., a sound signal, such as a tone); the occurrence is a calendar event (e.g., some certain auditory icon as the sound signal);
the event is named "Meeting" (e.g., speech synthesis output);
duration is one hour;
location is "meeting room"; and
participants are "John, Bill, Jill".

Note that a Calendar event description may have more levels or layers of information than those listed above.

As can be noted in FIG. 2, a particular presentation token 42 can include one or more of these attributes 41 of the content item 40. For example, a presentation token 42 can include the location and/or the starting time plus a name.

In accordance with the exemplary embodiments the user is enabled to define a mapping for the presentation tokens 42 and their presentation by selected ones of the output modalities 48, e.g., by defining the contents of presentation tokens 42 and the output modalities 48 to be used for presenting the tokens 42 to the user.

Input/Trigger Modalities 47

The presentation 42 tokens can be defined as a temporal sequence, where an individual presentation token 42 is displayed or presented (that is, made manifest) to the user only when triggered. This is shown (logically) in FIG. 2 as a plurality of two input gates 46, where one input is a particular presentation token 42 and the other input is a trigger 44. A given input trigger 44 may be defined by the user as, for example, one of a speech command entered via the microphone 24, a key press entered via the keypad 26 (or the touch display 16), or a haptic gesture made by tapping the device 10, or by moving the device 10, and that is detectable by the gesture sensor 28. One or more default trigger events may be assumed (e.g., a key press) that is used unless changed by the user.

Output Modalities 48

The presentation tokens 42 may be output with any one of the output modalities 48, for example, the speech synthesizer 20, by graphical elements and their changes on the visual display 16, by the use of lighting effects, by the use of audio and voice, and/or by the use of vibro-tactile signals using the tactile output 22.

Each of the presentation tokens 42 may be output using a different one of the output modalities 48. The triggering method may define the output of a next token, e.g., tapping on the device 10 may trigger textual output, whereas a spoken command may trigger a synthesized voice output.

An exemplary use case is now presented in the context of a voice output of Caller ID. In this case assume the user receives a call in a mobile context via the transceiver 30, and the incoming call is indicated with a ringing tone. To hear the caller name via the speech synthesizer 20 the user triggers a voice output token with a speech command: "who". If the user does not speak the voice command, then the caller's name is not enunciated, and the device remains quiet.

As another exemplary use case, an alarm clock/calendar, the user hears a clock/calendar alarm signal, and the display 16 may present a generic alarm icon. In response the user employs a haptic tapping pattern, e.g., a double/triple tap, that is detected by the gesture sensor 28. Detection of the tapping generator results in the generation of a first predefined trigger 44, and in response the corresponding presentation token 42 is routed to the user-selectable output modality 48, such as the display 16 so that the user can view the subject of the event (what event was preset to trigger the alarm). To see or hear additional details regarding the alarm event the user may repeat the tapping pattern, or may use another tapping pattern, or may use another input modality 47 (e.g., a key press or a spoken word, e.g., "details"). This generates a second trigger, and a second presentation token from the alarm content item 40 is presented using the same or a different output modality 48. These actions can be repeated to generate one or more additional triggers 44, resulting in the presentation of one or more corresponding additional presentation tokens 42. If one assumes that the selected output modality 48 is the display 16, the result may be scrolling text that is readable by the user to obtain additional information regarding the alarm event. Alternatively, if the user gives a specific voice command the device 10 may use the speech synthesis unit 20 to provide the output, but if the command is gesture-based in nature the output may be provided to the user in a textual format (using display screen 16). Alternatively, certain type (e.g., a certain tap pattern) of gesture input may result in voice output, while a different tap pattern may result in textual output.

As can be appreciated, as the triggers 44 are sequentially generated the presentation tokens 42 are sequentially provided to the user via a selected one or ones of the output modalities 48.

Of course, if at the first indication of the alarm event the user is currently indisposed to receive further information, or if the user recalls why the alarm event has occurred and does not require further information, then none of the input modalities 47 need by used, resulting in none of the additional presentation tokens 42 being presented to the user.

Further, the above-described presentation may be rejected/dismissed by the user at any time to terminate the presentation of the tokens 42. Also, it is within the scope of the exemplary embodiments to permit the user to reroute or redirect a presentation token from one output modality to another (e.g., a token to be displayed on the screen 16 may be switched so as to be presented instead by the speech synthesizer 20 and acoustic transducer 18). This can be accomplished by recognizing a specific user input that causes redirection of the presentation token.

Note further that the presentation tokens 42 may actually be presented to the user via an output modality that is external to the device 10, such as by using an external audio system, a headset, an external display screen or an Internet tablet, as non-limiting examples. In this case the token to be presented may be communicated via a link (e.g., a Bluetooth™ link) to an external device for presentation. Related to the preceding paragraph, the exemplary embodiments also enable the user to reroute or redirect a token from being presented by an internal output modality 48 of the device 10 to an output modality of an external device.

It should further be appreciated that while the token presentation has been described in the context of trigger signals generated explicitly by the user, in other embodiments one or more of the triggers 44 may be generated implicitly. Note as well that one or more of the triggers 44 may be generated as a function of the state of the device 10. For example, if the device 10 is capable of sensing, or being informed of, its speed (such as when used in a vehicle), one or more trigger may be inhibited, such as one that results in presentation of the associated token on the display screen, or the token presentation may be automatically rerouted or redirected to an audio-based or tactile-based output modality.

The use of these exemplary embodiments provides a number of advantages, including the preservation of privacy and an avoidance of disclosing private information, the enablement of mobile interaction, e.g., eyes-free output usage, and an adaptation to a user's need for different levels of detail, providing the user a possibility to selectively expand (or contract) presented information.

It can be appreciated that one particularly useful application for the exemplary embodiments of this invention is when the user is driving a vehicle. In this context the user will typically have limited availability of hands and vision for interaction with the device 10. In addition, when others are present in the vehicle (whether the user is the driver or not) there may be a need to exert privacy control to prevent the other vehicle occupants from becoming privy to the user's private information.

It should be also appreciated that the exemplary embodiments of this invention provide for output information to be divided into a sequence of multimodal tokens, each of which increases a level of detail or change an abstraction level or expands the level/amount of information provided to a user of the device 10. The sequence of outputting the presentation tokens 42 may be controlled/triggered through any multimodal input, which may be predefined by the user during a setup procedure using, for example, the display screen 16 and the keypad/keyboard 26. Further, the presentation tokens 42 can be output in any desired modality, which may be defined by the user during the setup procedure. Further, the presentation tokens 42 can be output using a certain output modality 48 that is adapted to or selected by the input modality used for generating the trigger 44. As non-limiting examples, use of the gesture sensor 28 to generate the trigger 44 may result in automatically selecting textual output on the display screen 16, while use of the microphone 24 and VR 24A with a spoken command to generate the trigger 44 may result in automatically selecting auditory output using the speech synthesizer 20 and the loudspeaker 18.

Figure 3:
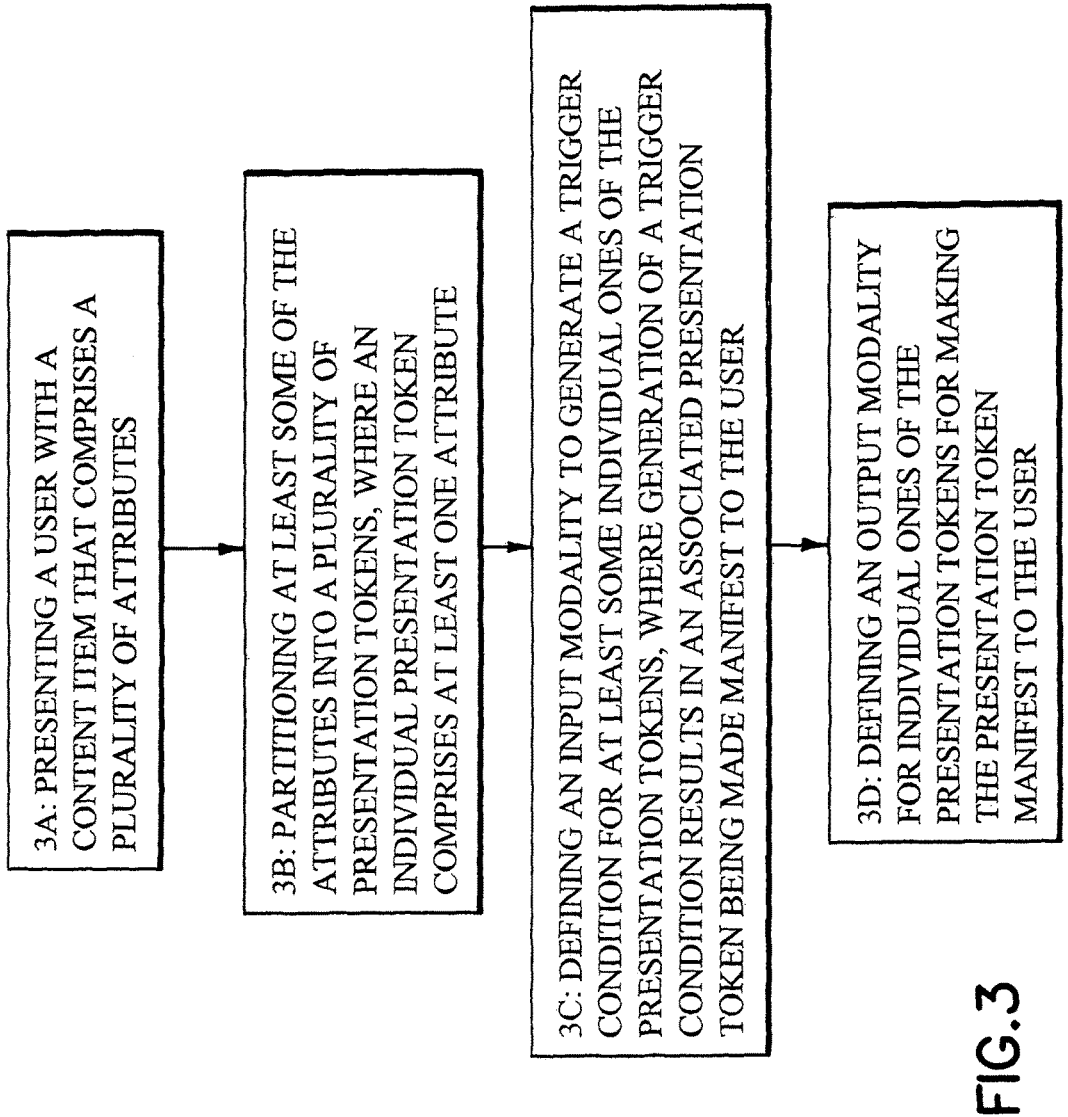
FIG. 3 is a logic flow diagram that illustrates a method, and the result of execution of computer program instructions by the data processor shown in FIG. 1.

Referring now to FIG. 3, in accordance with a method of this invention, and the result of execution of the PROG 124A by the data processor 12, there is an operation of: (3A) presenting a user with a content item 40 that comprises a plurality of attributes 41; (3B) partitioning at least some of the attributes 42 into a plurality of presentation tokens 42, where an individual presentation token 42 comprises at least one attribute; and (3C) defining an input modality to generate a trigger condition 44 for at least some individual ones of the presentation tokens 42, where generation of a trigger condition 44 results in an associated presentation token 42 being made manifest to the user.

In the method of the preceding paragraph, where presenting uses the display screen 16.

In the method of the preceding paragraphs, where one trigger condition is generated by activation of a physical or virtual key of a user input device, where one trigger condition is generated by recognition of a word spoken by the user, and where one trigger condition is generated by recognition of a gesture made by the user.

In the method of the preceding paragraphs, further comprising an operation of (3D) defining an output modality for individual ones of the presentation tokens for making the presentation token manifest to the user.

In the method of the preceding paragraph, where one output modality comprises an acoustic transducer, where one output modality comprises a speech synthesis unit, where one output modality comprises a transducer capable of generating a tactile sensation, and where one output modality comprises the display screen.

In the method of the preceding paragraphs, where generation of the trigger condition by a certain input modality for a particular presentation token automatically defines one of a plurality of output modalities for making the particular presentation token manifest to the user.

In the method of the preceding paragraph, where a plurality of the trigger conditions are generated sequentially by actions of the user for causing the corresponding plurality of presentation tokens to be made manifest to the user.

The various blocks shown in FIG. 3 may be viewed as method steps, and/or as operations that result from operation of computer program code, and/or as a plurality of coupled logic circuit elements constructed to carry out the associated function(s). The execution of the various blocks 3A-3D may be achieved at least in part by presenting the user with information on the display 16, such as menu-structured information or graphically-presented information, enabling the user via the user input device(s) to select at least some of the attributes 41 for inclusion in various presentation tokens, and to define associated trigger conditions 44 and possibly to also define desired ones of the output modalities 48 for presenting the tokens to the user (if the output modalities are not preselected or defaulted by the selected trigger conditions, as described above). All of this user-defined information may then be stored in the memory 14 for use when the associated content item 40 is presented to the user.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. The design of integrated circuits is by and large a highly automated process. Complex and powerful software tools are available for converting a logic level design into a semiconductor circuit design ready to be fabricated on a semiconductor substrate. Such software tools can automatically route conductors and locate components on a semiconductor substrate using well established rules of design, as well as libraries of pre-stored design modules. Once the design for a semiconductor circuit has been completed, the resultant design, in a standardized electronic format (e.g., Opus, GDSII, or the like) may be transmitted to a semiconductor fabrication facility for fabrication as one or more integrated circuit devices.

Various modifications and adaptations may become apparent to those skilled in the relevant arts in view of the foregoing description, when read in conjunction with the accompanying drawings and the appended claims. As one example, the use of other similar, equivalent or different input modalities and/or output modalities may be attempted by those skilled in the art. However, all such and similar modifications of the teachings of this invention will still fall within the scope of this invention.

Further, while the exemplary embodiments have been described above in the generally in the context of calendar/alarm and call reception (with Caller ID announcement) type applications, this was done merely to illustrate and describe the operation of the exemplary embodiments, and should not be construed as any limitation on the use and practice of these exemplary embodiments.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the examples of this invention may be used to advantage without the corresponding use of other features. As such, the foregoing description should be considered as merely illustrative of the principles, teachings, examples and exemplary embodiments of this invention, and not in limitation thereof.

What is claimed is:

1. A method, comprising:
operating at least one data processor of a handheld mobile device to present a user of the handheld mobile device with a notification of an event on a display screen, wherein the event comprises a plurality of attributes;
using an input modality of one of a plurality of input modalities of the mobile device and the at least one data processor to partition at least some of the attributes into a plurality of presentation tokens, where an individual presentation token comprises at least one attribute of the event;
defining one of the plurality of input modalities to generate a trigger condition for at least some individual ones of the presentation tokens, where generation of a trigger condition results in an associated presentation token being made manifest to the user via one of a plurality of output modalities of the handheld mobile device that is selectable by the user;
detecting user interaction in response to presenting the user with the notification of the event; and
generating one or more trigger conditions based on the user interaction.

2. The method of claim 1, where one trigger condition is generated by activation of a physical or virtual key of a user input device.

3. The method of claim 1, where one trigger condition is generated by recognition of a word spoken by the user.

4. The method of claim 1, where one trigger condition is generated by recognition of a gesture made by the user.

5. The method of claim 1, further comprising in response to sensing a current state of the mobile device, automatically selecting a different output modality than the output modality selected by the user to make the associated presentation token manifest to the user of the mobile device.

6. The method of claim 1, where one output modality comprises an acoustic transducer.

7. The method of claim 1, where one output modality comprises a speech synthesis unit.

8. The method of claim 1, where one output modality comprises a transducer capable of generating a haptic sensation.

9. The method of claim 1, where one output modality comprises a display screen.

10. The method of claim 1, where generation of the trigger condition by a certain input modality for a particular presentation token automatically defines one of a plurality of output modalities for making the particular presentation token manifest to the user.

11. The method of claim 1, where a plurality of the trigger conditions are generated sequentially by actions of a user for causing the corresponding plurality of presentation tokens to be made manifest to the user.

12. The method of claim 1, wherein:
the presenting a user with the notification of the event, and the partitioning at least some of the attributes into a plurality of presentation tokens are performed by the at least one data processor at the handheld mobile device.

13. A method, comprising:
operating at least one data processor of a mobile device to present a user of the mobile device with a notification on a display screen that comprises a plurality of attributes corresponding to the notification;
in response to user input from an input modality of one of a plurality of input modalities of the mobile device, generating, using the at least one data processor, a sequence of presentation tokens by partitioning at least some of the attributes, where an individual presentation token comprises at least one attribute;

receiving a first predefined user input from an input modality of one of the plurality of input modalities in response to presenting the user with the notification;

in response to receiving the first predefined user input, providing a first presentation token of the sequence of presentation tokens to the user via one of a plurality of output modalities of the mobile device that is selectable by the user;

receiving a second predefined user input from an input modality of one of the plurality of input modalities; and in response to the second predefined user input, providing a second presentation token of the sequence of presentation tokens to the user via one of the plurality of output modalities of the mobile device that is selectable by the user, wherein the second presentation token refines the level of detail or expands the amount of information as compared to the first presentation token.

14. The method of claim 1, wherein the plurality of presentation tokens comprises a sequence of presentation tokens, and wherein a plurality of trigger conditions are generated for causing at least some of the presentation tokens to be made manifest to the user in order of the sequence of presentation tokens.

15. The method of claim 1, wherein the notification of the event is generated by an application stored in a memory of the handheld mobile device.

16. The method of claim 1, wherein the notification of the event is at least one of: a calendar notification; an alarm notification; and a call notification.

17. The method of claim 1, wherein the attributes of the event comprise at least one of: a name, a date, a location, and a time corresponding to the event.

18. A non-transitory computer-readable medium that stores program instructions, the execution of the program instructions by at least one data processor of a handheld mobile device results in operations that comprise:

presenting a user with a notification of an event on a display screen, wherein the event comprises a plurality of attributes;

in response to user input from an input modality of one of a plurality of input modalities of the mobile device, partitioning at least some of the attributes into a plurality of presentation tokens, where an individual presentation token comprises at least one attribute of the event;

in response to further user input, defining one of the plurality of input modalities to generate a trigger condition for at least some individual ones of the presentation tokens, where generation of a trigger condition results in an associated presentation token being made manifest to the user via one of a plurality of output modalities of the handheld mobile device that is selectable by the user; and detecting user interaction in response to presenting the user with the notification of the event;

generating one or more trigger conditions based on the user interaction.

19. The computer-readable medium of claim 18, where one trigger condition is generated by activation of a physical or virtual key of a user input device, where another trigger condition is generated by recognition of a word spoken by the user, and where another trigger condition is generated by recognition of a gesture made by the user.

20. The computer-readable medium of claim 18, further comprising an operation of, in response to sensing a current state of the handheld mobile device, automatically selecting a different output modality than the output modality selected by the user to make the associated presentation token manifest to the user of the handheld mobile device.

21. The computer-readable medium of claim 20, where one output modality comprises an acoustic transducer, where another output modality comprises a speech synthesis unit, where another output modality comprises a transducer capable of generating a haptic sensation, and where another output modality comprises a display screen.

22. The computer-readable medium of claim 18, where generation of the trigger condition by a certain input modality for a particular presentation token automatically defines one of a plurality of output modalities for making the particular presentation token manifest to the user.

23. The computer-readable medium of claim 18, where a plurality of the trigger conditions are generated sequentially by actions of a user for causing the corresponding plurality of presentation tokens to be made manifest to the user.

24. The non-transitory computer-readable medium of claim 18, wherein the execution of the program instructions by the at least one data processor occurs at the handheld mobile device.

25. An apparatus, comprising:

a user interface comprised of a plurality of input modalities and a plurality of output modalities;

a data processor; and a non-transitory memory including computer program code, the memory and the computer program code configured to, with the data processor, cause the apparatus at least to:

present a user with a notification of an event on a touch-sensitive display screen, wherein the event comprises a plurality of attributes and, in response to user input, to partition at least some of the attributes into a plurality of presentation tokens, where an individual presentation token comprises at least one attribute of the event;

respond to further user input to define one of said plurality of input modalities to generate a trigger condition for at least some individual ones of the presentation tokens, where generation of a trigger condition results in an associated presentation token being made manifest to the user via one of the plurality of output modalities that is selectable by the user;

detecting user interaction in response to presenting the user with the notification of the event; and generate one or more trigger conditions based on the user interaction, wherein the apparatus is a handheld mobile device.

26. The apparatus of claim 25, where the memory and the computer program code are configured to, with the data processor, cause the apparatus at least to:

respond to sensing a current state of the apparatus, to automatically select a different output modality than the output modality selected by the user to make the associated presentation token manifest to the user.

27. The apparatus of claim 26, where said plurality of input modalities comprise two or more of physical or virtual keys, an input acoustic transducer, and the touch-sensitive display screen, and where said plurality of output modalities comprise two or more of an output acoustic transducer, a transducer capable of generating a haptic sensation, and the touch-sensitive display screen.

28. The apparatus of claim 25, where the memory and the computer program code are configured to, with the data processor, cause the apparatus at least to:

respond to generation of a trigger condition by a certain one of said plurality of input modalities, for a particular presentation token, to automatically select one of said plurality of output modalities for making the particular presentation token manifest to the user.

29. The apparatus of claim 25, wherein:
the presenting a user with the notification of the event, and the partitioning at least some of the attributes into a plurality of presentation tokens are performed by the at least one data processor at the handheld mobile device.

30. The method of claim 13, wherein in response to the second predefined input, the second presentation token is provided to the user via a different one of the plurality of output modalities.

31. The method of claim 13, wherein the second predefined user input is a repeat of the first predefined user input.

* * * * *